(12) United States Patent
Tokuda

(10) Patent No.: US 11,473,267 B2
(45) Date of Patent: Oct. 18, 2022

(54) CONSTRUCTION MACHINE

(71) Applicant: KOBELCO CONSTRUCTION MACHINERY CO., LTD., Hiroshima (JP)

(72) Inventor: Ayumu Tokuda, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 108 days.

(21) Appl. No.: 17/001,887

(22) Filed: Aug. 25, 2020

(65) Prior Publication Data

US 2021/0095439 A1 Apr. 1, 2021

(30) Foreign Application Priority Data

Sep. 26, 2019 (JP) .............................. JP2019-174925

(51) Int. Cl.
*E02F 9/00* (2006.01)
*E02F 9/08* (2006.01)

(52) U.S. Cl.
CPC .......... *E02F 9/0866* (2013.01); *E02F 9/0891* (2013.01); *B60Y 2200/41* (2013.01)

(58) Field of Classification Search
CPC .. B60K 11/04; E01F 9/226; E01F 9/08; E01F 9/0866; E01F 9/0891
USPC ........................................................ 180/291
See application file for complete search history.

(56) References Cited

U.S. PATENT DOCUMENTS

| | | | | |
|---|---|---|---|---|
| 7,717,218 | B2* | 5/2010 | Matsumoto | E02F 9/08 180/69.24 |
| 8,657,057 | B2* | 2/2014 | Bolz | B62D 21/186 180/312 |
| 8,708,087 | B2* | 4/2014 | Kashu | E02F 9/0883 180/291 |
| 8,973,692 | B1* | 3/2015 | Okuda | B60L 50/66 180/68.5 |
| 9,238,901 | B2* | 1/2016 | Kamimae | F01N 13/1855 |
| 9,366,009 | B2* | 6/2016 | Shintani | E02F 9/0833 |
| 9,623,746 | B2* | 4/2017 | Fujii | E02F 9/0833 |
| 10,081,929 | B2* | 9/2018 | Tsuda | E02F 3/32 |
| 10,161,101 | B2* | 12/2018 | Nishiguchi | B60K 11/04 |
| 10,323,557 | B2* | 6/2019 | Kubota | E02F 9/18 |
| 2013/0071212 | A1* | 3/2013 | Yunoue | E02F 9/226 414/685 |

(Continued)

FOREIGN PATENT DOCUMENTS

JP 10-338036 A 12/1998
JP 2013-076267 A 4/2013

*Primary Examiner* — Hau V Phan
(74) *Attorney, Agent, or Firm* — Oblon, McClelland, Maier & Neustadt, L.L.P.

(57) ABSTRACT

A construction machine includes an upper frame, a machine room structure that is disposed on the upper frame and defines a machine room, a hood that has a box shape, has a lower surface, and is connected to the machine room structure so as to be disposed above the machine room, the lower surface including a hood opening communicating with the machine room, and at least one reinforcement plate that is interposed between the machine room structure and the hood to reinforce connection between the machine room structure and the hood. An outer end portion of the reinforcement plate extends further outward in a left-right direction than the beam member of the machine room structure.

5 Claims, 6 Drawing Sheets

(56) References Cited

U.S. PATENT DOCUMENTS

2016/0244946 A1\* 8/2016 Sanada ................ E02F 9/0808
2018/0238020 A1\* 8/2018 Hirasawa ............... B60K 11/04

\* cited by examiner

CONSTRUCTION MACHINE

TECHNICAL FIELD

The present invention relates to a construction machine, and more particularly, to a construction machine having a hood disposed above a machine room.

BACKGROUND

Construction machines having a machine room and a hood disposed above the machine room have been conventionally known. For example, in JP 2013-76267 A, a hood for covering a device projecting upward from a machine room is provided above the machine room. In addition, in JP H10-338036 A, an upper surface of an engine room is covered by an engine hood.

Meanwhile, when the position of a radiator is changed or a pressure tank is installed in a machine room, a part of these devices largely projects upward from the machine room. As a result, a hood provided above the machine room also tends to increase in size.

When the hood increases in size, a side wall of the hood is disposed at substantially the same position as a side wall (side panel) of the machine room, as described in JP H10-338036 A mentioned above. In this case, the hood may be placed on an upper surface of a beam extending across columns arranged in a front-rear direction on a side of the machine room. In order to place and mount the hood on the beam, it is necessary to have a mounting portion supported on the upper surface of the beam at a lower end portion of the side wall of the hood.

However, since the side wall of the hood is disposed closer to the side of the machine (outside in width direction) than the beam, it is impossible to have sufficient contact area between the mounting portion and the upper surface of the beam, and thus sufficient strength cannot be achieved in the mounting portion of the hood.

SUMMARY

An object of the present invention is to provide a construction machine in which a hood is placed on a beam extending across columns arranged in a front-rear direction on a side of a machine room, and to improve the strength of the beam and a mounting portion of the hood placed on the beam so as to stably support the hood in the construction machine.

In order to achieve the above object, the present invention provides a construction machine. The construction machine includes:

an upper frame that has a frame upper surface facing upward;

a machine room structure that is fixed on the frame upper surface and defines a machine room of the construction machine together with the frame upper surface;

a hood that has a box shape, has a lower surface, and is connected to the machine room structure so as to be disposed above the machine room, the lower surface including a hood opening communicating with the machine room; and at least one reinforcement plate that is interposed between the machine room structure and the hood to reinforce connection between the machine room structure and the hood.

The machine room structure includes:

a plurality of columns each of which has a column upper end portion, the plurality of columns including a first column and a second column that are arranged on a side of the machine room so as to be spaced from each other in a front-rear direction;

a plurality of beams each of which has a beam upper surface, the plurality of beams including a beam member connecting the column upper end portions of the first column and the second column to each other in the front-rear direction; and a side panel that is attached to at least one of the first column and the second column so as to cover an opening defined by the frame upper surface, the first column, the second column, and the beam member from an outside of the machine room.

The hood includes:

a top plate disposed so as to cover the machine room from above;

a vertical plate extending downward from an end portion of the top plate; and a mounting portion extending inward in a left-right direction from a lower end portion of the vertical plate above the beam member, the mounting portion including a mounting proximal end portion connected to the lower end portion of the vertical plate, a mounting distal end portion that is disposed opposite to the mounting proximal end portion and defines the hood opening, and a mounting lower surface that is a lower surface of the mounting portion, the lower surface connecting the mounting proximal end portion and the mounting distal end portion to each other along the left-right direction.

The at least one reinforcement plate is disposed so as to extend in the left-right direction between the mounting portion and the beam member in a vertical direction, and includes an outer end portion disposed further outward in the left-right direction than the beam upper surface of the beam member with the machine room as a reference, an inner end portion disposed opposite to the outer end portion in the left-right direction and below the mounting distal end portion, a plate lower surface that is a lower surface of the reinforcement plate that faces the beam upper surface, the plate lower surface connecting the outer end portion and the inner end portion to each other in the left-right direction and being in close contact with the beam upper surface, and a plate upper surface that is an upper surface of the reinforcement plate that faces the mounting lower surface, the plate upper surface connecting the outer end portion and the inner end portion to each other in the left-right direction and being in close contact with the mounting lower surface. The outer end portion of the reinforcement plate is disposed further inward in the left-right direction than the side panel with the machine room as a reference.

DETAILED DESCRIPTION

Figure 1:
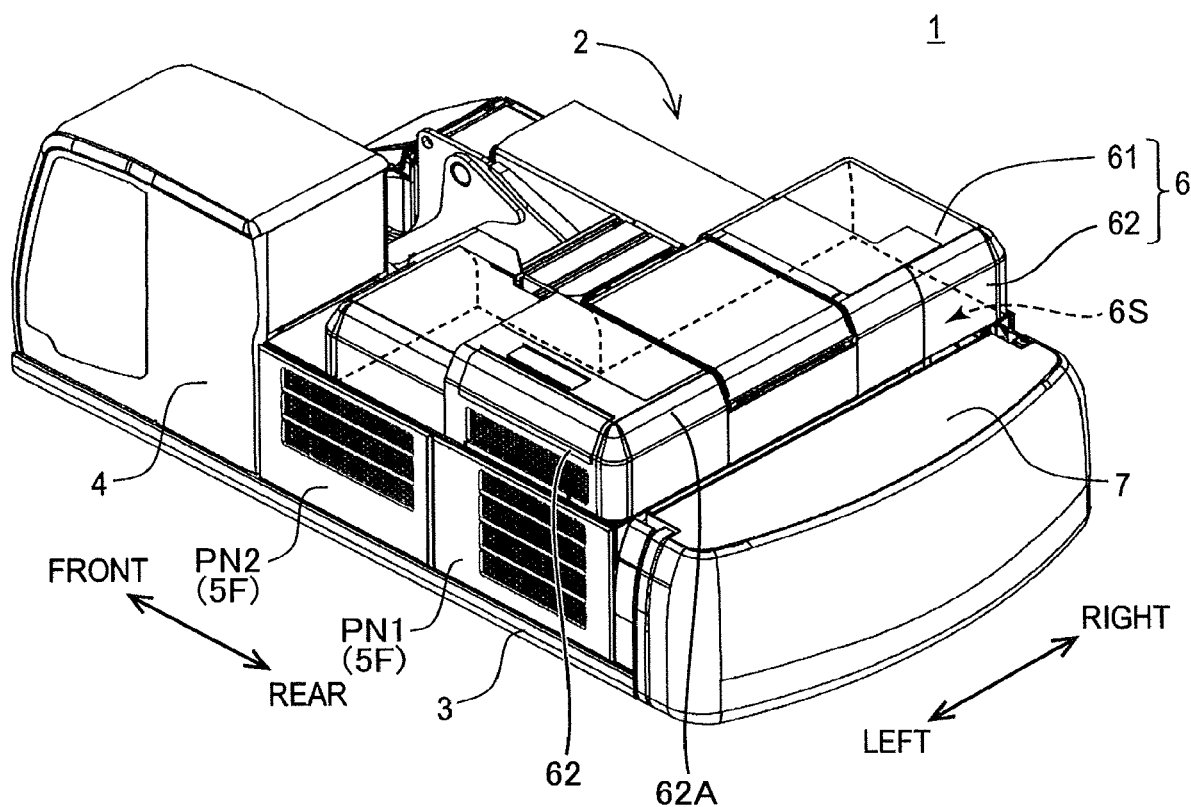
FIG. 1 is a perspective view illustrating a part (upper slewing body) of a construction machine according to an embodiment of the present invention.
Figure 2:
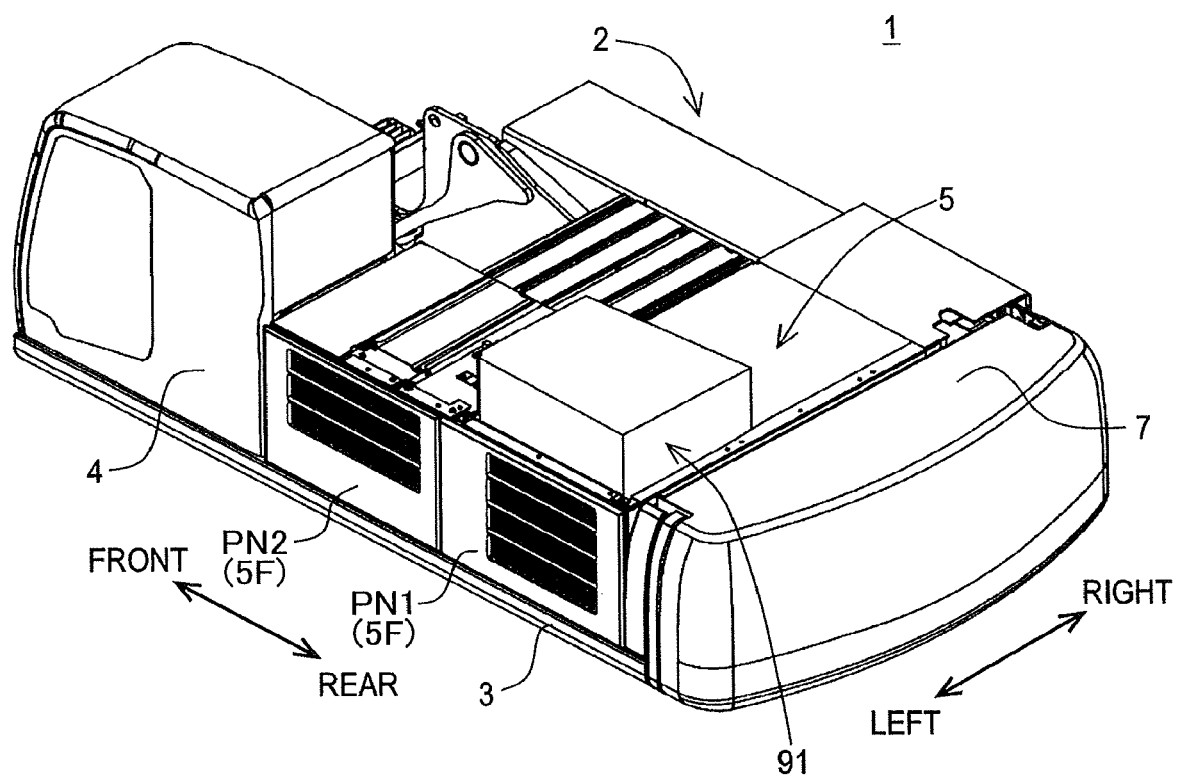
FIG. 2 is a perspective view of the upper slewing body illustrated in FIG. 1 with a hood removed.
Figure 3:
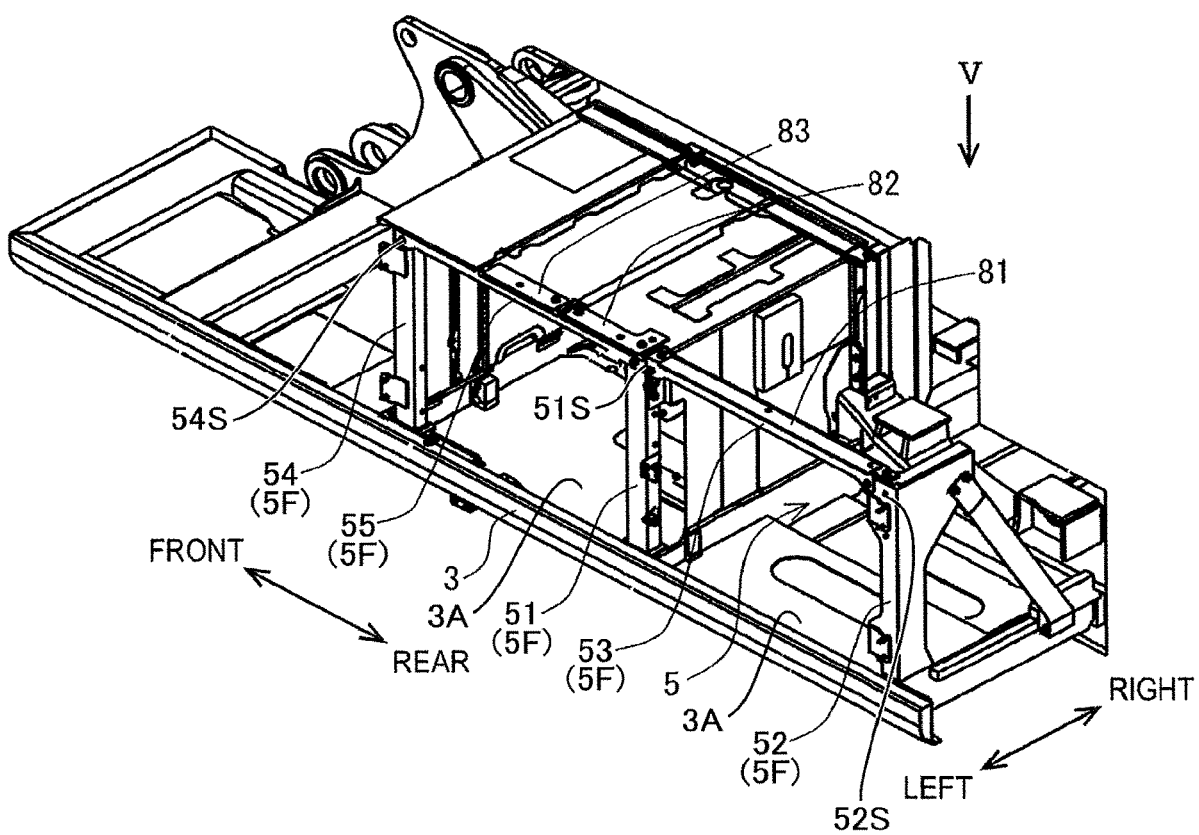
FIG. 3 is a perspective view of a part of a machine room structure of the construction machine according to an embodiment of the present invention, as viewed from an upper left diagonal position on a rear side.
Figure 4:
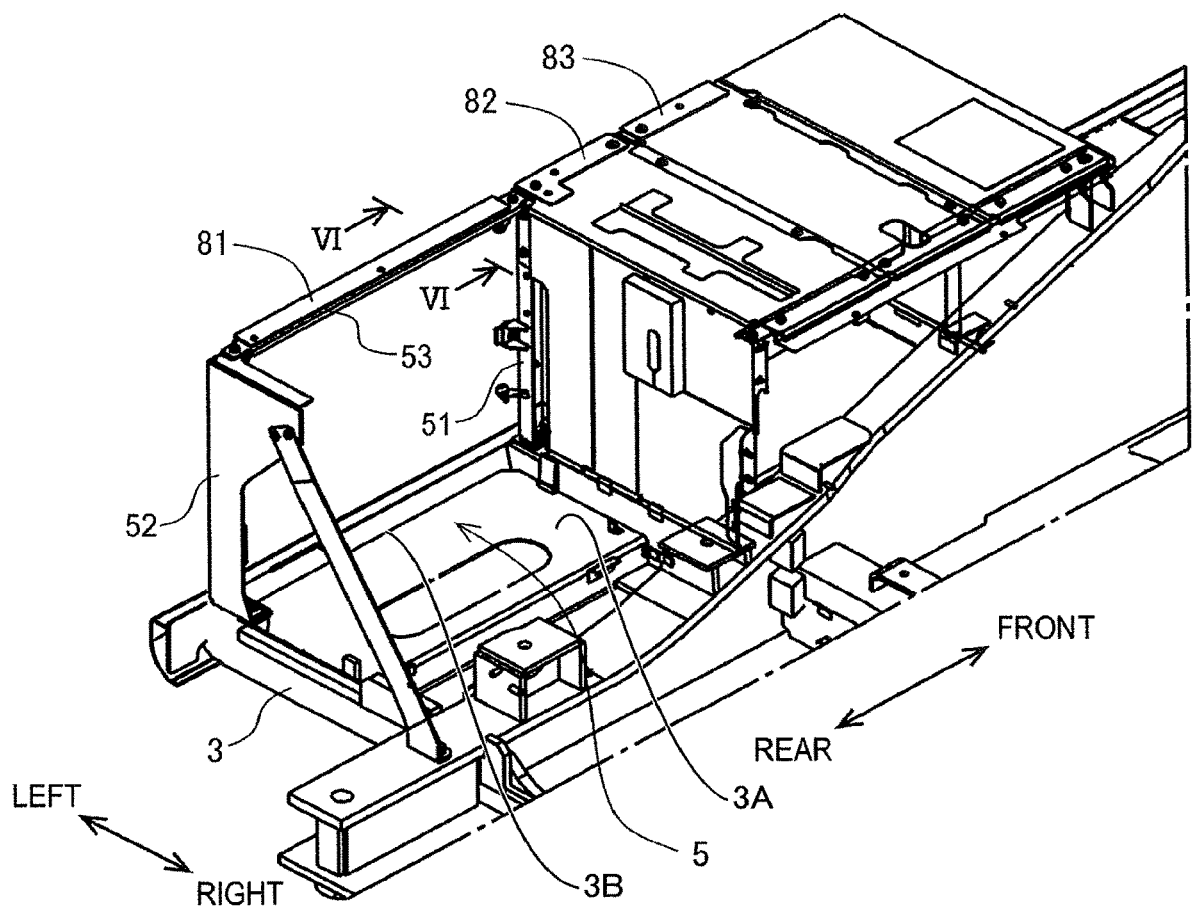
FIG. 4 is a perspective view of a part of the machine room structure of the construction machine according to an embodiment of the present invention, as viewed from an upper right diagonal position on the rear side.
Figure 5:
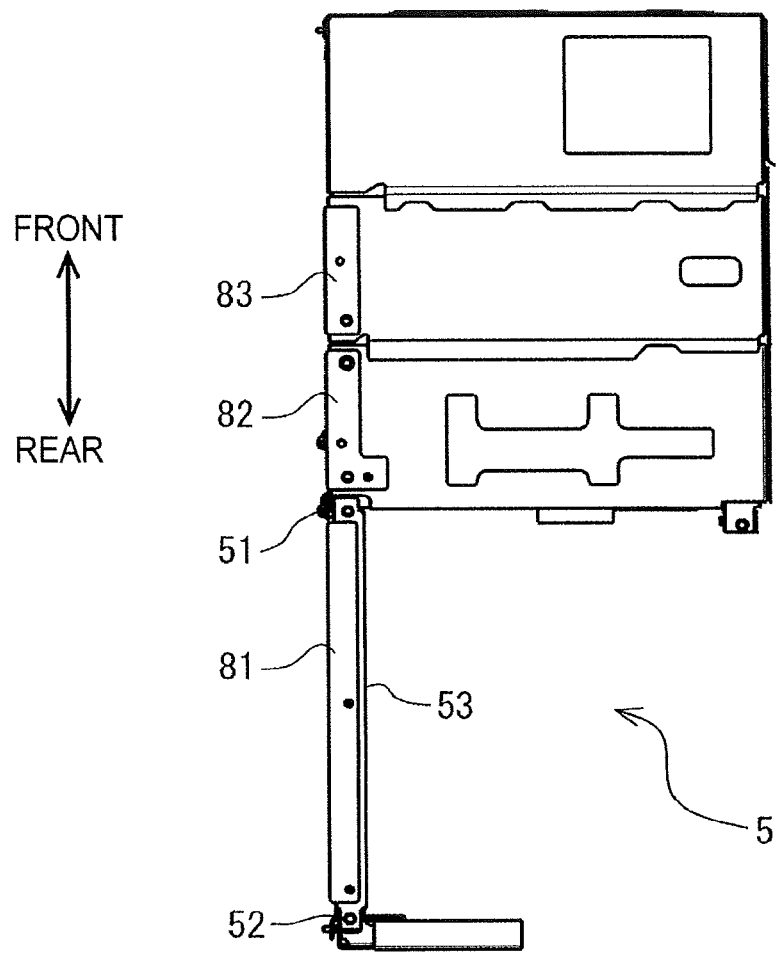
FIG. 5 is a plan view of FIG. 3 as viewed along an arrow V.
Figure 6:
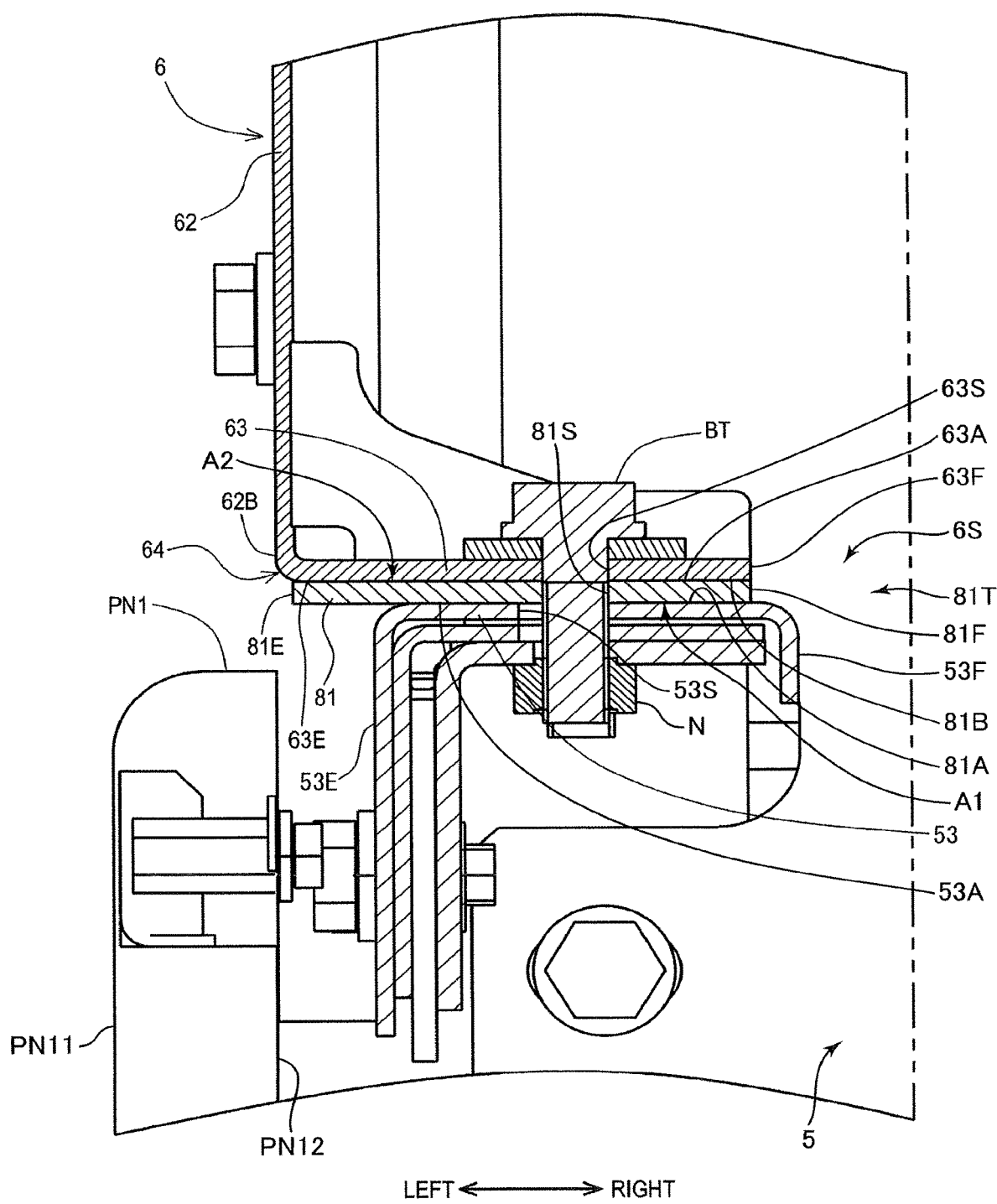
FIG. 6 is a cross-sectional view illustrating a cross-section cut at a position VI-VI in FIG. 4, with a side panel and the hood being mounted to the cross-section.

A construction machine according to an embodiment of the present invention will be described with reference to FIGS. 1 to 6. In the following description, a hydraulic excavator 1 (see FIGS. 1 and 2) having a large engine installed thereon is illustrated as an example of the construction machine. FIG. 1 is a perspective view illustrating a part (upper slewing body) of the hydraulic excavator 1 according to an embodiment of the present invention. FIG. 2 is a perspective view of an upper slewing body 2 illustrated in FIG. 1, with a hood 6 to be described later removed. FIG. 3 is a perspective view of a part of a machine room structure 5F of the hydraulic excavator 1 according to an embodiment of the present invention, as viewed from an upper left diagonal position on a rear side. FIG. 4 is a perspective view of a part of the machine room structure 5F of the hydraulic excavator 1 according to an embodiment of the present invention, as viewed from an upper right diagonal position on the rear side. FIG. 5 is a plan view of FIG. 3 as viewed along an arrow V. FIG. 6 is a cross-sectional view illustrating a cross-section cut at a position VI-VI in FIG. 4, with a side panel PN1 and the hood 6 to be described later being mounted to the cross-section.

As illustrated in FIG. 1, the hydraulic excavator 1 includes a lower travelling body (not illustrated) and the upper slewing body 2 that is installed on the lower traveling body so as to be able to slew.

As illustrated in FIGS. 1 and 2, the upper slewing body 2 has an upper frame 3, a cab 4, a machine room structure 5F (illustrated only in FIG. 2), the hood 6 (illustrated only in FIG. 1), and a counterweight 7.

As illustrated in FIGS. 3 and 4, the upper frame 3 has a frame upper surface 3A that faces upward. The frame upper surface 3A has a frame side portion 3B that extends along a front-rear direction on one end side (left end side in FIGS. 3 and 4) of the upper frame 3 in a left-right direction.

The machine room structure 5F is a structure that is fixed on the frame upper surface 3A and defines the machine room 5 (FIG. 2) together with the frame upper surface 3A. The machine room 5 is an engine room that is installed on the upper frame 3 and houses an engine and peripheral devices therein. In the present embodiment, as illustrated in FIG. 2, a cooling device 91 (radiator, pressure tank, or the like) largely projects upward from the machine room 5. A part of the device projecting upward from the machine room 5 is covered by the hood 6 illustrated in FIG. 1.

As illustrated in FIGS. 3 and 4, the machine room structure 5F (skeleton or frame) has a plurality of columns 51, 52, and 54 extending upward from the upper frame 3 and a plurality of beams 53 and 55.

While FIGS. 3 and 4 illustrate a part of the left side of the machine room structure 5F, a part of the right side of the machine room structure 5F (not illustrated) also has similar columns and beams.

As illustrated in FIG. 3, the three columns 51, 52, and 54 are arranged upright on the frame upper surface 3A on the left side of the machine room 5 along the frame side portion 3B so as to be spaced from each other in the front-rear direction. Specifically, the column 52 is arranged behind the column 51, and the column 54 is arranged in front of the column 51. The three columns 51, 52, 54 have column upper end portions 51S, 52S, and 54S, respectively.

As illustrated in FIGS. 3 and 4, the beam 53 (beam member) is a member extending in the front-rear direction so as to connect the column upper end portion 51S of the column 51 (first column) and the column upper end portion 52S of the column 52 (second column) in the front-rear direction. In addition, the beam 53 has a beam upper surface 53A (see FIG. 6). A reinforcement plate 81 (see FIG. 5) for fixing the hood 6 is welded to the beam upper surface 53A.

The beam 55 is a member continuously extending in the front-rear direction so as to connect the column upper end portion 51S of the column 51 and the column upper end portion 54S of the column 54 in the front-rear direction. Three top plates are placed on an upper surface of the beam 55. Reinforcement plates 82 and 83 (see FIG. 5) for placing and fixing the hood 6 are welded to two top plates on the rear among the three top plates.

The reinforcement plates 81, 82, and 83 are members that are interposed between the machine room structure 5F and the hood 6 to reinforce connection between the machine room structure 5F and the hood 6.

As illustrated in FIGS. 1 and 2, the machine room structure 5F also has side panels PN1 and PN2 disposed on the left side surface of the machine room 5. The left side surface of the machine room 5 is defined by these side panels PN1 and PN2. The side panels PN1 and PN2 are also referred to as guards or side guards.

The side panel PN1 is openably and closably attached to the column 51 and the column 52 so as to cover a left side opening formed by the column 51, the column 52, the beam 53, and the frame side portion 3B from the outside of the machine room 5. The side panel PN1 may be attached to at least one of the column 51 and the column 52. The side panel PN2 is attached to the column 51 and the column 54 so as to cover a left side opening formed by the column 51, the column 54, the beam 55, and the frame side portion 3B from the outside. The side panel PN2 may be attached to at least one of the column 51 and the column 54.

As illustrated in FIG. 1, the hood 6 is an L-shaped member in a top view, the member being provided on the upper side of the machine room 5, and is a member for covering a part of the device projecting upward from the machine room 5 such as the cooling device 91 (radiator, pressure tank, or the like).

Specifically, the hood 6 is a box-shaped member that has a lower surface and is connected to the machine room structure 5F so as to be disposed above the machine room 5, and includes a top plate 61, a plurality of vertical plates 62 bent downward from an end portion of the top plate 61 to extend, and a mounting portion 63 (FIG. 6). A hood opening 6S (FIGS. 1 and 6) communicating with the machine room 5 is formed in the lower surface of the hood 6.

The top plate 61 is disposed so as to cover the machine room 5 from above.

Each of the plurality of vertical plates 62 includes a vertical plate upper end portion 62A (FIG. 1) connected to the top plate 61 and a vertical plate lower end portion 62B opposite to the vertical plate upper end portion 62A in a vertical direction. Further, the vertical plate 62 disposed above the side panel PN1 (vertical plate 62 refers to this vertical plate 62 in following description) among the plurality of vertical plates 62 is disposed above the beam 53 in the vertical direction and further outward in the left-right direction than the beam 53 with the machine room 5 as a reference, as illustrated in FIG. 6.

As illustrated in FIG. 6, the mounting portion 63 is bent inward from the vertical plate lower end portion 62B to extend in a horizontal direction. More specifically, the mounting portion 63 extends in the left-right direction above the beam 53, as illustrated in FIG. 6. In addition, in the present embodiment, the mounting portion 63 continuously extends along the front-rear direction so as to face the reinforcement plates 81, 82, and 83 illustrated in FIG. 3. The mounting portion 63 includes a mounting proximal end portion 63E connected to the vertical plate lower end portion 62B, a mounting distal end portion 63F that is disposed opposite to the mounting proximal end portion 63E in the left-right direction and defines the hood opening 6S, and a mounting lower surface 63A that is a lower surface of the mounting portion 63 and connects the mounting proximal end portion 63E and the mounting distal end portion 63F to each other along the left-right direction.

The hood 6 also has a corner R portion 64 (R portion, curved portion). The corner R portion 64 connects the vertical plate lower end portion 62B of the vertical plate 62 and the mounting proximal end portion 63E of the mounting portion 63 to each other, and has a circular arc shaped cross-section orthogonal to the front-rear direction, as illustrated in FIG. 6. The corner R portion 64 includes an outer peripheral surface formed of a curved surface projecting outward in the cross-section orthogonal to the front-rear direction.

The vertical plate 62 of the hood 6 is disposed closer to a machine center line side (right side or inner side in left-right direction) than the side panels PN1 and PN2 in a machine width direction (left-right direction) in consideration of transportation restrictions and the like.

The structure of the reinforcement plates 81, 82, and 83 will be described in detail below by taking the reinforcement plate 81 as an example. Other reinforcement plates also have the similar structure.

The reinforcement plate 81 is a plate-like member having a substantially rectangular shape in a plan view, and is disposed so as to extend in the left-right direction between the mounting portion 63 and the beam 53 (beam upper surface 53A) in the vertical direction. In addition, the reinforcement plate 81 continuously extends along the front-rear direction between the columns 51 and 52 (between a pair of front and rear columns).

The reinforcement plate 81 has an outer end portion 81E, an inner end portion 81F, a plate lower surface 81A, and a plate upper surface 81B. The outer end portion 81E is one end portion of the reinforcement plate 81, and is disposed further outward in the left-right direction than the beam 53 with the machine room 5 as a reference. The inner end portion 81F is the other end of the reinforcement plate 81, and is disposed opposite to the outer end portion 81E in the left-right direction. The inner end portion 81F is disposed below the mounting distal end portion 63F, and defines a communication space 81T (FIG. 6) that allows the hood opening 6S and the machine room 5 to communicate with each other.

The plate lower surface 81A is a lower surface of the reinforcement plate 81 that faces the beam upper surface 53A of the beam 53, and connects the outer end portion 81E and the inner end portion 81F to each other in the left-right direction. The plate upper surface 81B is an upper surface of the reinforcement plate 81 that faces the mounting lower surface 63A of the mounting portion 63, and connects the outer end portion 81E and the inner end portion 81F to each other in the left-right direction. More specifically, when viewed from the front-rear direction as illustrated in FIG. 6, the beam 53, the mounting portion 63, and the reinforcement plate 81 are connected to each other so that the plate lower surface 81A of the reinforcement plate 81 is in close contact with the beam upper surface 53A of the beam 53 in a first region in the left-right direction, and the plate upper surface 81B of the reinforcement plate 81 is in close contact with the mounting lower surface 63A of the mounting portion 63 in a second region that is larger than the first region in the left-right direction and extends further outward in the left-right direction than the beam upper surface 53A.

The beam 53 has an inner side surface 53F disposed so as to face the machine room 5 and an outer side surface 53E that faces the side panel PN1. As illustrated in FIG. 6, in a state where the mounting portion 63 of the hood 6 is fixed (connected) to the beam 53 with the reinforcement plate 81 being interposed therebetween, the outer end portion (machine left side end portion) 81E of the reinforcement plate 81 is disposed further outward in the left-right direction than the outer side surface (machine left side end portion) 53E of the beam 53 and further inward in the left-right direction (machine center side, right side in FIG. 6) than the side panel PN1 with the machine room 5 as a reference.

More specifically, the outer end portion 81E of the reinforcement plate 81 is disposed further outward in the left-right direction (machine left side) than the mounting proximal end portion 63E of the mounting portion 63 and further inward in the left-right direction (machine center side) than the outer side surface (left side surface) of the vertical plate 62, that is, is disposed immediately below the corner R portion 64.

Further, the mounting distal end portion 63F of the mounting portion 63 and the inner end portion 81F of the reinforcement plate are disposed further outward in the left-right direction than the inner side surface 53F of the beam 53 with the machine room 5 as a reference.

Although detailed description is omitted, the reinforcement plates 82 and 83 (FIGS. 3 and 4) described above also have the similar arrangement relationship to the reinforcement plate 81 except that two top plates are present.

As illustrated in FIG. 6, a beam hole 53S passing the beam 53 along the vertical direction is formed in the beam upper surface 53A of the beam 53. The reinforcement plate 81 is formed of a plate hole 81S that passes the reinforcement plate 81 in the vertical direction so as to communicate with the beam hole 53S. Further, the mounting portion 63 is formed of a mounting hole 63S that passes the mounting portion 63 in the vertical direction so as to communicate with the plate hole 81S. Each of these holes is formed in plural, and the holes are spaced away from each other along the front-rear direction. The hydraulic excavator 1 also has a plurality of bolts BT and a plurality of nuts N (both of which are connecting members). As illustrated in FIG. 6, the bolt BT is inserted into the mounting hole 63S, the plate hole 81S, and the beam hole 53S in this order from above, and the nut N is tightened to the distal end of the bolt BT. As a result, the machine room structure 5F, the hood 6, and the reinforcement plate 81 are connected to each other by the bolt BT and the nut N. At this time, the machine room structure 5F, the hood 6, and the reinforcement plate 81 are connected to each other so that the plate upper surface 81B of the reinforcement plate 81 is in close contact with the mounting lower surface 63A of the mounting portion 63, and the plate lower surface 81A of the reinforcement plate 81 is in close contact with the beam upper surface 53A of the beam 53.

As described above, in the present embodiment, the reinforcement plate 81 is provided on the beam upper surface 53A of the beam 53 extending across the column 51 and the column 52 that are arranged on the left side (side) of the machine room 5 so as to be spaced from each other in the front-rear direction. In addition, the outer end portion 81E of the reinforcement plate 81 is disposed further outward in the left-right direction than the outer side surface 53E of the beam 53 and further inward in the left-right direction than the side panel PN1.

Consequently, the contact area between the mounting portion 63 and the reinforcement plate 81 becomes larger as compared with a case where the mounting portion 63 of the hood 6 is directly placed on the upper surface of the beam 53, and sufficient strength of the mounting portion 63 and the beam 53 can be achieved.

Further, in the present embodiment, since the reinforcement plate 81 does not project to the left side beyond the side panel PN1, it is possible to comply with transportation regulations with respect to a machine width direction based on laws.

Moreover, according to the embodiment described above, the reinforcement plate 81 continuously extends in the front-rear direction with respect to the beam 53. For this reason, the contact area between the mounting portion 63 of the hood 6 and the reinforcement plate 81 increases as compared with a case where a plurality of reinforcement plates are arranged so as to be spaced from each other in the front-rear direction, and thus higher strength can be achieved.

Further, according to the embodiment described above, as illustrated in FIG. 6, the outer end portion 81E of the reinforcement plate 81 is disposed closer to the machine left side than the mounting proximal end portion 63E of the mounting portion 63, that is, immediately below the corner R portion 64.

Consequently, even when the vertical plate 62 of the hood 6 is disposed further outward in the left-right direction than the outer side surface 53E of the beam 53, the reinforcement plate 81 extending to the machine left side reliably supports the mounting portion 63 of the hood 6, as illustrated in FIG. 6. As a result, the mounting portion 63 of the hood 6 is prevented from being deformed or broken.

Moreover, according to the embodiment described above, the outer end portion 81E of the reinforcement plate 81 is disposed immediately below the corner R portion 64, and the reinforcement plate 81 does not project further outward in the left-right direction than the vertical plate 62. Consequently, the visibility of the hood 6 and the side panel PN1 from outside is not impaired.

Further, according to the embodiment described above, as illustrated in FIGS. 5 and 6, the reinforcement plate 81 projects not to the machine center side (inner side in left-right direction) but to the machine left side (outer side in left-right direction) with respect to the beam 53. It is thus possible to secure a large interior space without reducing the interior space of the machine room 5.

In particular, as illustrated in the figures, the inner end portion 81F of the reinforcement plate 81 and the mounting distal end portion 63F of the mounting portion 63 are disposed further outward in the left-right direction than the inner side surface 53F of the beam 53. Consequently, it is only required to dispose a device to be housed such as the cooling device 91 (FIG. 2) to be housed in the machine room 5 with the position of the inner side surface 53F as a reference. That is, the inner end portion 81F of the reinforcement plate 81 and the mounting distal end portion 63F of the mounting portion 63 are prevented from interfering with the cooling device 91. Further, in this case, the contact area between the mounting portion 63 and the beam upper surface 53A with the reinforcement plate 81 being interposed therebetween is reduced inside of the bolt BT in the left-right direction, but the reinforcement plate 81 is in contact with the mounting portion 63 over a wide range outside of the bolt BT in the left-right direction. Consequently, the hood 6 can be stably supported by the machine room structure 5F including the beam 53.

Moreover, according to the embodiment described above, the machine left side portion of the hood 6 having an L-shape in a top view is long in the front-rear direction, and the left side portion of the hood 6 is entirely supported by the three reinforcement plates 81, 82, and 83. It is thus possible to avoid the deformation of the entire hood 6.

The construction machine according to the present invention is not limited to the embodiment described above, and various modifications and improvements can be made within the scope of the claims.

For example, while the embodiment described above exemplifies the case where the reinforcement plates 81, 82, and 83 are provided on the beams 53 and 55 on the left side, the present invention is not limited thereto, and the reinforcement plates may be provided on beams on the right side. In addition, the number of the reinforcement plates is not limited to the number mentioned in the above embodiment.

Further, while the embodiment described above exemplifies the case where the reinforcement plate 81 continuously extends in the front-rear direction with respect to the beam 53, the present invention is not limited thereto. For example, a plurality of reinforcement plates may be arranged with respect to the beam 53 so as to be spaced from each other in the front-rear direction.

Moreover, the above embodiment describes an aspect in which the outer end portion 81E of the reinforcement plate 81 is disposed further inward in the left-right direction than an inner side surface PN12 of the side panel PN1. However, the outer end portion 81E may be disposed further inward in the left-right direction than an outer side surface PN11 of the side panel PN1 and further outward in the left-right direction than the inner side surface PN12.

As described above, the configuration according to the present invention is suitable for a construction machine having a large hood above a machine room.

The present invention provides a construction machine. The construction machine includes:

an upper frame that has a frame upper surface facing upward;

a machine room structure that is fixed on the frame upper surface and defines a machine room of the construction machine together with the frame upper surface;

a hood that has a box shape, has a lower surface, and is connected to the machine room structure so as to be disposed above the machine room, the lower surface including a hood opening communicating with the machine room; and at least one reinforcement plate that is interposed between the machine room structure and the hood to reinforce connection between the machine room structure and the hood.

The machine room structure includes:

a plurality of columns each of which has a column upper end portion, the plurality of columns including a first column and a second column that are arranged on a side of the machine room so as to be spaced from each other in a front-rear direction;

a plurality of beams each of which has a beam upper surface, the plurality of beams including a beam member connecting the column upper end portions of the first column and the second column to each other in the front-rear direction; and a side panel that is attached to at least one of the first column and the second column so as to cover an opening defined by the frame upper surface, the first column, the second column, and the beam member from an outside of the machine room.

The hood includes:

a top plate disposed so as to cover the machine room from above;

a vertical plate extending downward from an end portion of the top plate; and a mounting portion extending inward in a left-right direction from a lower end portion of the vertical plate above the beam member, the mounting portion including a mounting proximal end portion connected to the lower end portion of the vertical plate, a mounting distal end portion that is disposed opposite to the mounting proximal end portion and defines the hood opening, and a mounting lower surface that is a lower surface of the mounting portion, the lower surface connecting the mounting proximal end portion and the mounting distal end portion to each other along the left-right direction.

The at least one reinforcement plate is disposed so as to extend in the left-right direction between the mounting portion and the beam member in a vertical direction, and includes:

an outer end portion disposed further outward in the left-right direction than the beam upper surface of the beam member with the machine room as a reference;

an inner end portion disposed opposite to the outer end portion in the left-right direction and below the mounting distal end portion;

a plate lower surface that is a lower surface of the reinforcement plate that faces the beam upper surface, the plate lower surface connecting the outer end portion and the inner end portion to each other in the left-right direction and being in close contact with the beam upper surface; and a plate upper surface that is an upper surface of the reinforcement plate that faces the mounting lower surface, the plate upper surface connecting the outer end portion and the inner end portion to each other in the left-right direction and being in close contact with the mounting lower surface.

According to this configuration, the contact area between the mounting portion and the reinforcement plate is larger than the contact area between the mounting portion and the beam upper surface in a case where the mounting portion of the hood is directly placed on the beam upper surface of the beam member, and thus the strength of the mounting portion and the beam member can be improved.

In the configuration described above, it is preferable that the outer end portion of the reinforcement plate is disposed further inward in the left-right direction than the side panel with the machine room as a reference.

According to this configuration, since the reinforcement plate does not project outward in the left-right direction beyond the side panel, it is possible to reliably comply with transportation regulations with respect to a machine width direction based on laws.

In the configuration described above, it is preferable that the reinforcement plate continuously extends along the front-rear direction between the first column and the second column.

According to this configuration, the contact area between the mounting portion of the hood and the reinforcement plate increases as compared with a case where a plurality of reinforcement plates are arranged between the pair of front and rear columns so as to be spaced from each other in the front-rear direction, and thus higher strength can be achieved by the mounting portion of the hood and the beam member.

In the configuration described above, the hood includes a curved portion connecting the lower end portion of the vertical plate and the mounting proximal end portion to each other, the curved portion including an outer peripheral surface formed of a curved surface projecting outward in a cross-section orthogonal to the front-rear direction, and in a state where the mounting portion of the hood is connected to the beam member with the reinforcement plate being interposed between the mounting portion and the beam member, the outer end portion of the reinforcement plate is preferably disposed immediately below the curved portion.

According to this configuration, the reinforcement plate extends immediately below the vertical plate of the hood, and thus the mounting portion of the hood can be reliably supported by the reinforcement plate. As a result, the mounting portion of the hood is prevented from being deformed or broken. Further, it is possible to prevent the outer end portion of the reinforcement plate from coming into contact with a part of the hood and causing scratches or the like.

In the configuration described above, the beam member has an inner side surface disposed so as to face the machine room, and the mounting distal end portion of the mounting portion and the inner end portion of the reinforcement plate are preferably disposed further outward in the left-right direction than the inner side surface of the beam member with the machine room as a reference.

According to this configuration, compared with a case where the mounting portion and the reinforcement plate are disposed so as to extend further inward in the left-right direction (machine room side) than the inner side surface of the beam member, the machine room and the hood can house a larger device to be housed without reducing the area of a region where the machine room communicates with the hood in a plan view.

In the configuration described above, the beam upper surface is provided with a beam hole passing the beam member along the vertical direction, the reinforcement plate includes a plate hole passing the reinforcement plate in the vertical direction so as to communicate with the beam hole, and the mounting portion includes a mounting hole passing the mounting portion in the vertical direction so as to communicate with the plate hole, the construction machine preferably further including a connecting member that is inserted into the beam hole, the plate hole, and the mounting hole in order to connect the machine room structure, the hood, and the reinforcement plate to each other.

According to this configuration, as the connecting member connects portions where the beam member, the reinforcement plate, and the mounting portion overlap with each other along the vertical direction, the hood can be stably fixed to the machine room structure.

This application is based on Japanese Patent application No. 2019-174925 filed in Japan Patent Office on Sep. 26, 2019, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
an upper frame that has a frame upper surface facing upward;
a machine room structure that is fixed on the frame upper surface and defines a machine room of the construction machine together with the frame upper surface;
a hood that has a box shape, has a lower surface, and is connected to the machine room structure so as to be disposed above the machine room, the lower surface being formed of a hood opening communicating with the machine room; and
at least one reinforcement plate that is interposed between the machine room structure and the hood to reinforce connection between the machine room structure and the hood,
wherein the machine room structure includes:
a plurality of columns, each of the plurality of columns having a column upper end portion, the plurality of columns including a first column and a second column that are arranged on a side of the machine room so as to be spaced from each other in a front-rear direction;
a plurality of beams, each of the plurality of beams having a beam upper surface, the plurality of beams including a beam member connecting the column upper end portions of the first column and the second column to each other in the front-rear direction; and
a side panel that is attached to at least one of the first column and the second column so as to cover an opening defined by the frame upper surface, the first column, the second column, and the beam member from an outside of the machine room;
the hood includes:
a top plate disposed so as to cover the machine room from above;
a vertical plate extending downward from an end portion of the top plate; and
a mounting portion extending inward in a left-right direction from a lower end portion of the vertical plate above the beam member, the mounting portion including a mounting proximal end portion connected to the lower end portion of the vertical plate, a mounting distal end portion that is disposed opposite to the mounting proximal end portion and defines the hood opening, and a mounting lower surface that is a lower surface of the mounting portion, the lower surface connecting the mounting proximal end portion and the mounting distal end portion to each other along the left-right direction;
the at least one reinforcement plate is disposed so as to extend in the left-right direction between the mounting portion and the beam member in a vertical direction, and includes:
an outer end portion disposed further outward in the left-right direction than the beam upper surface of the beam member with the machine room as a reference;
an inner end portion disposed opposite to the outer end portion in the left-right direction and below the mounting distal end portion;
a plate lower surface that is a lower surface of the reinforcement plate that faces the beam upper surface, the plate lower surface connecting the outer end portion and the inner end portion to each other in the left-right direction and being in close contact with the beam upper surface; and
a plate upper surface that is an upper surface of the reinforcement plate that faces the mounting lower surface, the plate upper surface connecting the outer end portion and the inner end portion to each other in the left-right direction and being in close contact with the mounting lower surface,
wherein the outer end portion of the reinforcement plate is disposed further inward in the left-right direction than the side panel with the machine room as a reference.

2. The construction machine according to claim 1, wherein the reinforcement plate continuously extends along a front-rear direction between the first column and the second column.

3. The construction machine according to claim 1, wherein
the hood includes a curved portion connecting the lower end portion of the vertical plate and the mounting proximal end portion to each other, the curved portion including an outer peripheral surface formed of a curved surface projecting outward in a cross-section orthogonal to a front-rear direction, and
in a state where the mounting portion of the hood is connected to the beam member with the reinforcement plate being interposed between the mounting portion and the beam member, the outer end portion of the reinforcement plate is disposed immediately below the curved portion.

4. The construction machine according to claim 1, wherein
the beam member has an inner side surface disposed so as to face the machine room, and
the mounting distal end portion of the mounting portion and the inner end portion of the reinforcement plate are disposed further outward in the left-right direction than the inner side surface of the beam member with the machine room as a reference.

5. The construction machine according to claim 1, wherein
the beam upper surface is formed of a beam hole passing the beam member along a vertical direction,
the reinforcement plate is formed of a plate hole passing the reinforcement plate in the vertical direction so as to communicate with the beam hole, and
the mounting portion is formed of a mounting hole passing the mounting portion in the vertical direction so as to communicate with the plate hole,
the construction machine further comprising a connecting member that is inserted into the beam hole, the plate hole, and the mounting hole in order to connect the machine room structure, the hood, and the reinforcement plate to each other.

\* \* \* \* \*